United States Patent [19]

Yoshida

[11] 3,846,626

[45] Nov. 5, 1974

[54] ELECTRONIC DESK CALCULATOR WITH VERIFICATION FUNCTION

[75] Inventor: Kunio Yoshida, Kenjiro Tsugawa, Yamatokoriyama, Japan

[73] Assignee: Sharp Kabushiki Kaisha, Osaka, Japan

[22] Filed: Dec. 29, 1972

[21] Appl. No.: 319,234

[30] Foreign Application Priority Data

Dec. 29, 1971 Japan .................................. 47-1045
Dec. 29, 1971 Japan .................................. 47-1046
Feb. 25, 1972 Japan .................................. 47-19868

[52] U.S. Cl. .......................... 235/153 BK, 235/177
[51] Int. Cl. .......................................... G06f 11/00
[58] Field of Search ...................... 235/153 BK, 177; 340/146.1 BA, 146.1 BA; 335/177

[56] References Cited

UNITED STATES PATENTS 2,789,759 4/1957 Tootill et al. ................ 235/153 BK
3,040,984 6/1962 Cox et al. ..................... 235/153 BK
3,660,646 5/1972 Minero et al. ................ 235/153 BK

FOREIGN PATENTS OR APPLICATIONS 1,020,438 2/1966 Great Britain ............... 235/153 BK

*Primary Examiner*—Malcolm A. Morrison
*Assistant Examiner*—David H. Malzahn
*Attorney, Agent, or Firm*—Stewart and Kolasch, Ltd.

[57] ABSTRACT

The present disclosure is directed to electronic desk calculators having an additional function for verifying the results of arithmetic operations. The verification system includes an additional register for storing the results of the previous arithmetic operation and a coincidence circuit for comparing the results of new arithmetic operation with that of the previous operation. The coincidence circuit is responsive to occurrences of operation termination signals, depression of one of function keys for instructing start of the arithmetic operations or a specified switch for instructing verification operations.

3 Claims, 7 Drawing Figures

PATENTED NOV 5 1974 SHEET 1 OF 5 3,846,626

| Key operation | | register | | |
|---|---|---|---|---|
| | | X | Y | VM |
| a | A | A | ? | ? |
| b | ⊠ | A | ? | ? |
| c | B | B | A | ? |
| d | ⊟ | C | A | ? |
| e | CL | 0 | 0 | C |
| f | A0 | A0 | 0 | C |
| g | ⊠ | A0 | 0 | C |
| h | B0 | B0 | A0 | C |
| i | ⊟ | C0 | A0 | C |
| | | ⋮ | | |

PATENTED NOV 5 1974

3,846,626

SHEET 4 OF 5

| operation example | | Key operation | register | | | | |
|---|---|---|---|---|---|---|---|
| | | | X | Y | VM1 | VM2 | |
| first A × B = C | a | A | A | ? | ? | ? | L off |
| | b | [×] | A | ? | ? | ? | |
| | c | B | B | A | ? | ? | |
| | d | [=] | C | A | ? | ? | |
| | e | Vch | 0 | A | C | ? | |
| Second A1 X B1 = C1 | f | A1 | A1 | A | C | ? | L off |
| | g | [×] | A1 | A | C | ? | |
| | h | B1 | B1 | A1 | C | ? | |
| | i | [=] | C1 | A1 | C | ? | |
| | j | Vch | 0 | A1 | C1 | C | |
| third A2 X B2 = C2 | k | A2 | A2 | A1 | C1 | C | L off |
| | l | [×] | A2 | A1 | C1 | C | |
| | m | B2 | B2 | A2 | C1 | C | |
| | n | [=] | C2 | A2 | C1 | C | |
| | o | Vch | 0 | A2 | C2 | C1 | |
| fourth A3 X B3 = C3 | p | A3 | A3 | A2 | C2 | C1 | L on |
| | q | [×] | A3 | A2 | C2 | C1 | |
| | r | B3 | B3 | A3 | C2 | C1 | |
| | s | [=] | C3 | A3 | C2 | C1 | |
| | | ⋮ | | | | | |

FIG. 7

ELECTRONIC DESK CALCULATOR WITH VERIFICATION FUNCTION

BACKGROUND OF THE INVENTION

This invention relates to electronic desk calculators, and more particularly to verification systems for use in electronic desk calculators for verifying the results of arithmetic operations.

As various additional functions other than four basic arithmetic operation functions have been provided to the electronic desk calculators, it has become possible to perform complicated arithmetic operations in accordance with the additional functions. However, the results of the arithmetic operation will disappear upon commencement of next operation unless they are printed on paper or otherwise recorded. As a result, in the case where the same operations are repeated in response to the same key depression modes, the results of the arithmetic operations cannot be compared therebetween in the non-printing calculators. Errors in operator's key depression and calculator's operations are, therefore, not detected either.

OBJECTS AND SUMMARY OF THE INVENTION

Accordingly, the primary object of this invention is to provide electronic desk calculators with verification systems capable of verifying the results of the arithmetic operations.

Another object of this invention is to provide electronic desk calculators with verification systems capable of deciding the coincidence between two results of the arithmetic operations repeatedly carried out in the same key operations by means of simple and efficient construction.

Still another object of this invention is to provide verification systems for use in electronic desk calculators for carrying out the verifying functions for a short time period.

A further object of this invention is to provide verification systems for use in electronic desk calculators for carrying out the verifying functions without increasing the expenditure on control signals.

Still further object of this invention is to provide verification systems for use in electronic desk calculators for deciding correctness of the results of the arithmetic operations in the case where both the results are different.

BRIEF DESCRIPTION OF THE DRAWINGS

FIG. 7 is a graphic representation showing key operation mode for the purpose of explanation of the verify function in FIG. 6.

DESCRIPTION OF THE PREFERRED EMBODIMENTS

Figure 1:
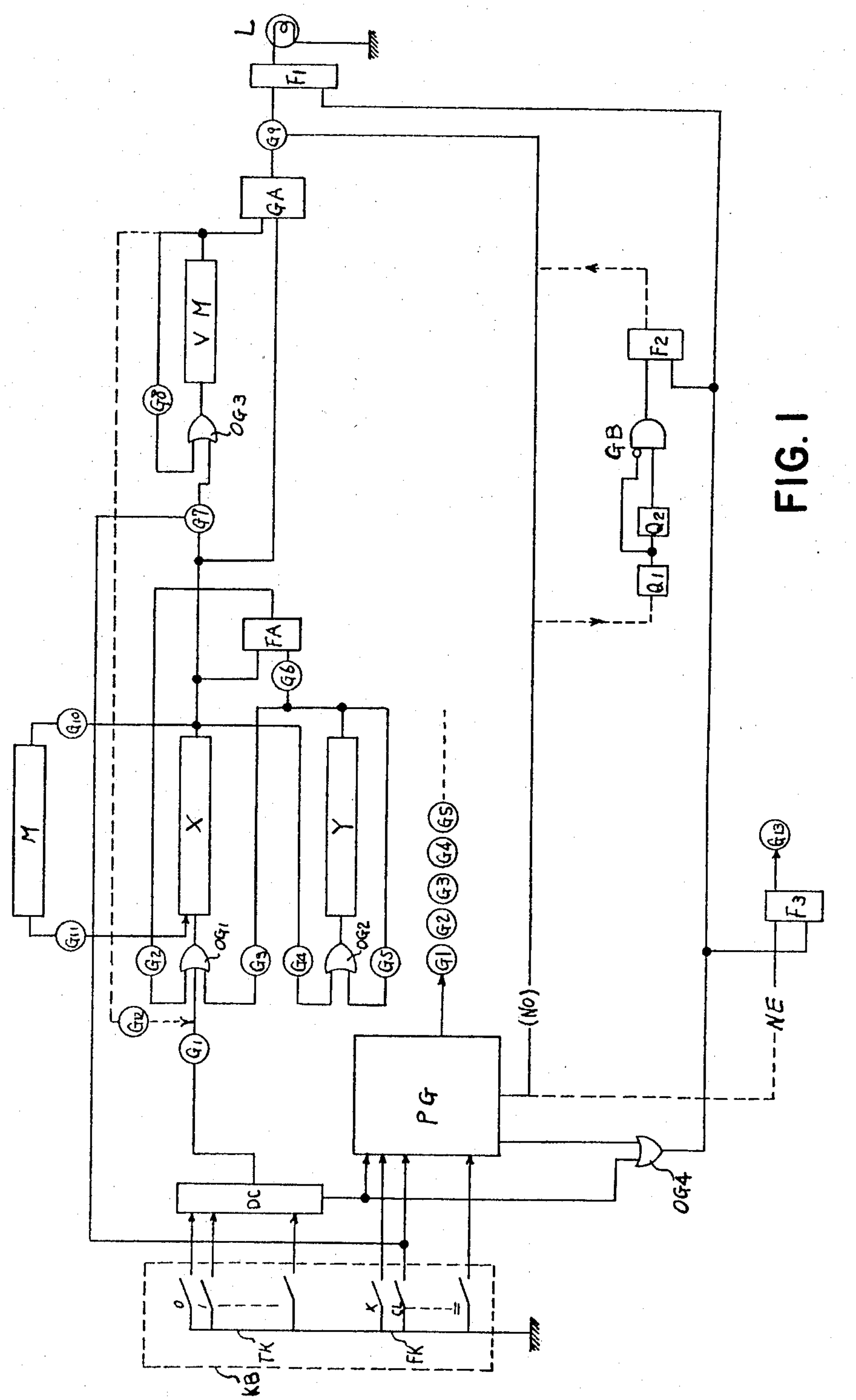
FIG. 1 is a schematic diagram showing a first embodiment of the electronic desk calculators with the verification systems in accordance with this invention.

Referring now to FIG. 1, the calculating machine with the verification system embodying this invention includes at least three registers X, Y, VM which are controlled by micro order signals derived from the fixed program memory PG. In this drawing the micro orders and their associated gate means are respectively designated by the symbols Ⓖ. The two registers X, Y serve as arithmetic registers storing the operands or operation results and the last register VM serves as the verifying register storing only the operation results in the verification mode. The verifying register is an additional register for the original calculating functions.

The individual signals from the keyboard KB provided with manually operated digit keys TK for the entering of numeral information and manually operated function keys FK for the entering of functional information are introduced into the arithmetic register X or the fixed program memory PG. For example, the operand information is decoded in the decoder DC in response to depression of the digit keys TK and then entered into the register X through the gate G1.

In the case of performing the arithmetic operation (A ⊠ B ⊟ C), the numeral A is first stored in the register X and then the multiplication instruction is stored in the program memory PG upon the depression of the function key ⊠. Successively, when the numeral B is introduced upon the digit key, the numeral A is transmitted via the gate G4 to the register Y and at this time the numeral B is stored in the register X. Under these circumstances the program memory is led into the computing status $\overline{NO}$ in response to the depression of the operation commencement key ⊟ so that the gates G2 to G6 are properly controlled by the occurred micro order signals to enable the arithmetic operation A⊠B in the adder FA. As a result, the results C are entered into the register X and the operand A into the register Y and, thereafter, the program memory is led into the non-computing status No upon termination of the arithmetic operations.

The above multiplication process necessitates more than several word length time periods (should the capacities of the registers X, Y be one word length and circulation period therein be one word length time periods). In order to carry out these processes by means of the program memory PG are required successive address selection controlled by a plurality of address flip-flops, conditional flip-flops and diode matrix circuits. That is to say, the fixed programs should be previously incorporated as hardware into the devices. The program memory PG stores programs corresponding the various function keys and thus delivers micro order signals necessary to perform the operations instructed by depression of the keys.

In the meanwhile, this invention is to provide verification functions as noted earlier. To this end the illustrated calculating machine is provided with the verifying memory VM (it may be a register and its capacity is equal to or more than the arithmetic register X). The contents of the register X are transferred into the memory VM in response to a specified key on the keyboard and then the coincidence between both contents of the registers X, Y is detected under the computing termination status No for verification purpose. The program memory is preset in such a way these steps are carried out in predetermined orders.

Figures 2, 3:
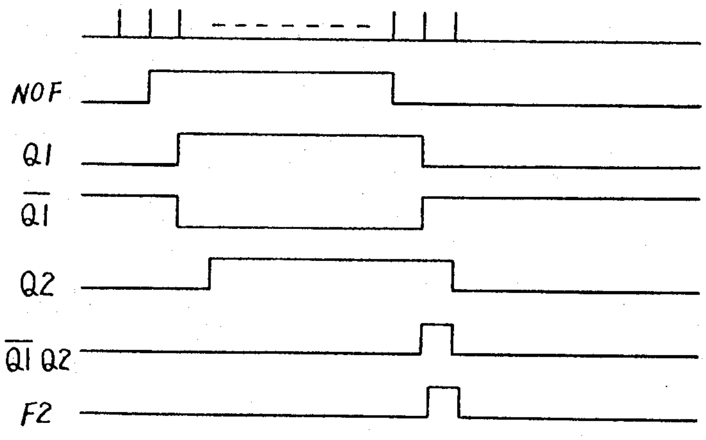
FIG. 2 is a graphic representation showing key operation mode for the purpose of explanation of the verify function.
FIG. 3 is a time chart showing the relation of the various pulses which occur in the circuit shown in FIG. 1.

The verification mode will be described below with reference to FIG. 2. Assume that the first operation is A ⊠ B ⊟ C and the second operation is A*o* ⊠ B*o* ⊟ C*o*.

The computing termination status ⓓ of the first arithmetic operation is under the above mentioned conditions. At this time a specified key (in this example, the clear key CL) is depressed. Upon such depression the registers X, Y are reset to '0' and the contents of the register X are introduced into the verify memory VM through the gate G7. The second arithmetic operation is carried out in the same operation mode as the first operation until the key operations A*o* ⊠ B*o* are repeated. Thereafter, upon depression of the ⊟ key the status is shifted to ⓓ wherein the arithmetic operation is completely terminated. Under the termination status NO the contents of the register X storing the second results and the verify memory storing the first results are compared to detect whether these are coincident. In this example the no-coincidence circuit GA decides the no-coincidence and the gate G9 controls the decision period. In deciding the no-coincidence, the contents of the register X and memory VM are synchronously led out bit by bit to compare therebetween. Even if the no-coincidence of only one bit appears, the no-coincidence circuit GA delivers the outputs via the gate G9 to set the flip-flop F1. The set output energizes an alarm lamp L to notify the operator of the no-coincidence. The lamp L is de-energized upon the appearance of key outputs from the clear key CL, the digit keys TK, etc. or of the reset outputs from the flip-flop F1.

The above no-coindidence circuit may comprise an exclusive OR gate or other equivalent circuits having the function to decide whether the contents of both the registers are coincident with each other. In addition, the lamp L visually notifying the operator of the no-coincidence may be substituted by sound or other display devices.

The comparision of the new operation results with the previous ones is effected in the following mode. Since the operation status $\overline{\text{NO}}$ exists in general during a short period immediately after the depression of the ⊟ key, a pair of the flip-flops Q1, Q2 detect transition conditions from the operation status NO to the non-operation status $\overline{\text{NO}}$. The detected outputs are stored in the flip-flop F2. The coincidence detection is carried out during this period. For example, should the address flip-flop NOF store the operation status and non-operation status, the gate GB delivers its outputs setting the flip-flop F2 only when the address flip-flop NOF is in the reset status (non-operation status) as shown in FIG. 3. The program memory PG is so constructed that the above-mentioned verify function is carried out in response to the outputs from the flip-flop F2, which is reset by the key outputs. Or, the program memory PG may be provided wit a new address NE, which is always established when the arithmetic operations are terminated and activates the flip-flop F3 to be in the set state.

To sum up the FIG. 1 embodiment, the verify function is carried out by the simple key operations in such a way that the contents of the register are transferred to the desired register (or memory) in response to the depression of the specified key and then the new operation results are compared with the previous ones stored in the desired register upon the appearance of the operation termination signals.

Ordinarily, the function keys FK includes keys instructing the four rules of arithmetic operations, a memory recall key [RC] associated with arithmetic operations with the memory, transfer to memory key [MR], etc. in addition to the clear key [CL], and the specified key instructing the verify operations may be one of the above keys or new exclusive one.

In the meanwhile, although the electronic calculators provided with one or more memories are capable of performing so-called memory calculations e.g. total calculations, the following modification is required in applying the verify operations of this invention to such memory-provided calculators since the verify operations are directed to the contents within the memories.

The arithmetic results stored in the memory M are transferred to the register X in response to the depression of the clear memory key [CM] and at this time the memory M is reset to '0'. Thereafter, upon the depression of the clear key [CL] the contents of the register X are transferred to the verify memory VM in the same mode previously described. After the same operation is repeated by the same key operations wherein errors may occur in the calculators' operations or operator's key operations, these results in the memory M should be transferred to the register X for the purpose of performing the verify operations. To this end, the arithmetic results in the memory M are read out to the register X in response to the depression of the clear memory key [CM] (or the memory recall key [MR] in some instances). However, the verify operations cannot be effected simultaneously with the operation termination signals mentioned above, because the memory calculations are processed in the non-operation status NO.

Hence the flip-flop F3 is caused to be set by the outputs from the clear memory key [CM] and the synchronizing signals P having one word time period and the verify functions are performed based upon the set outputs from the flip-flop F3. In other words in response to the outputs from the key [CM] the contents of the memory M are entered into the register X in synchronization with the synchronizing signals P after a time lapse of one word time and then the flip-clop F3 is set upon the termination of transference. Such control is taken over within the specified address associated with the depression of the clear memory key [CM].

Furthermore, the verify operations may be performed by a combination of individual keys. For example, the transference of the register contents is carried out in response to the key operations ⊟ → ⊠ and then the comparison of no-coincidence in response to the second key depression of ⊟ key after the first key operation for commencing the arithmetic operations.

As noted earlier, the invented calculators are capable of detecting errors in the calculators' or operator's operations in response to the simple key operations without complicated devices or methods.

Figure 4:
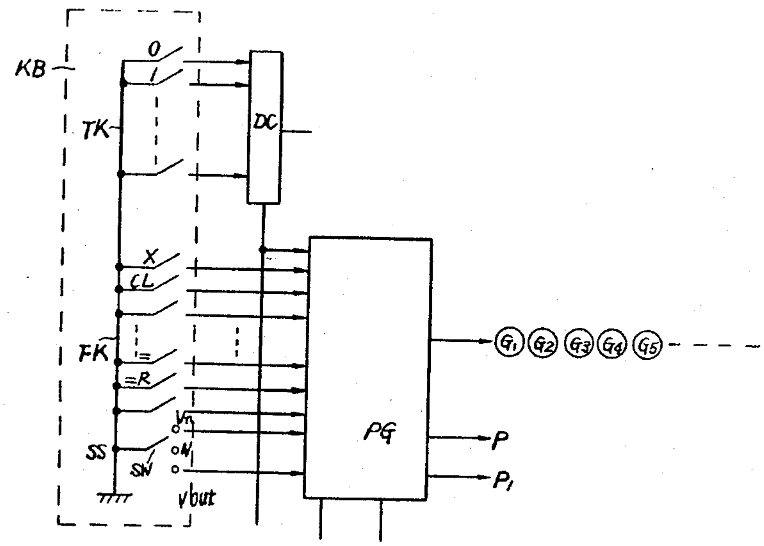
FIG. 4 is a schematic diagram showing a second embodiment of the verification systems.

FIG. 4 illustrates the second embodiment utilizing a specified switch SS exclusive for the purpose of the verify operations. The switch SS includes a verify preliminary terminal Vin, a neutral terminal N and a recall terminal Vout and a movable terminal SW and is so constructed that the movable terminal SW is returned to its original position after it contacts one of the three fixed terminals. In this case by contacting the terminal SW with the verify preliminary terminal Vin the contents of the register X are transferred into the verify memory VM via the gate G7 in FIG. 1 upon the appearance of the signals P having one word time period from the program memory PG. Thereafter, the verify operations are carried out in the same mode as previously mentioned.

Moreover, when the operator wishes to confirm the contents of the verify memory VM (or the previous results) in the cases of no-coincidence, the movable terminal SW is contacted with the recall terminal Vout. Upon the appearance of the switch output, the contents of the register X are transferred into the register Y via the gate G4 and the contents of the verify memory VM to the register X via the gate G12. At the same time the contents of the memory VM remain without disappearing. Since the register X is coupled with the display device, the contents of the memory VM could be vidually indicated.

Figure 5:
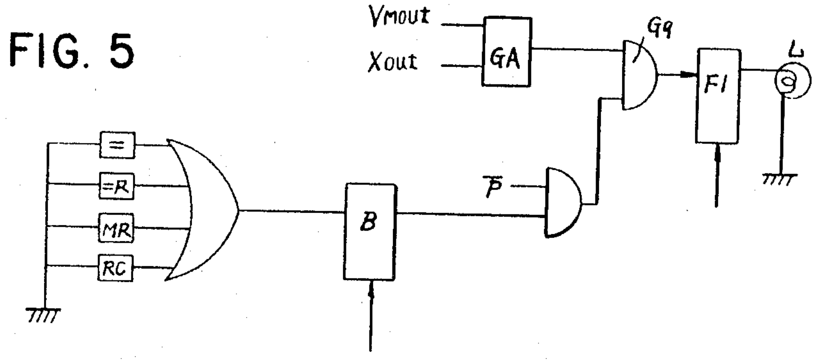
FIG. 5 is a schematic diagram showing one example of the coincidence circuit and its associated circuits.

Referring to FIG. 5, there is provided a flip-flop B which is set in response to the depression of the ⊟ key, which set outputs and the non-operation signal $\overline{P}$ are applied as AND outputs to the gate G9 to detect the coincidence or no-coincidence. In the illustrated example the no-coincidence gate G9 is further operative in response to the depression of the subtraction key [=R], memory recall key [MR] or recall key [RC].

Figure 6:
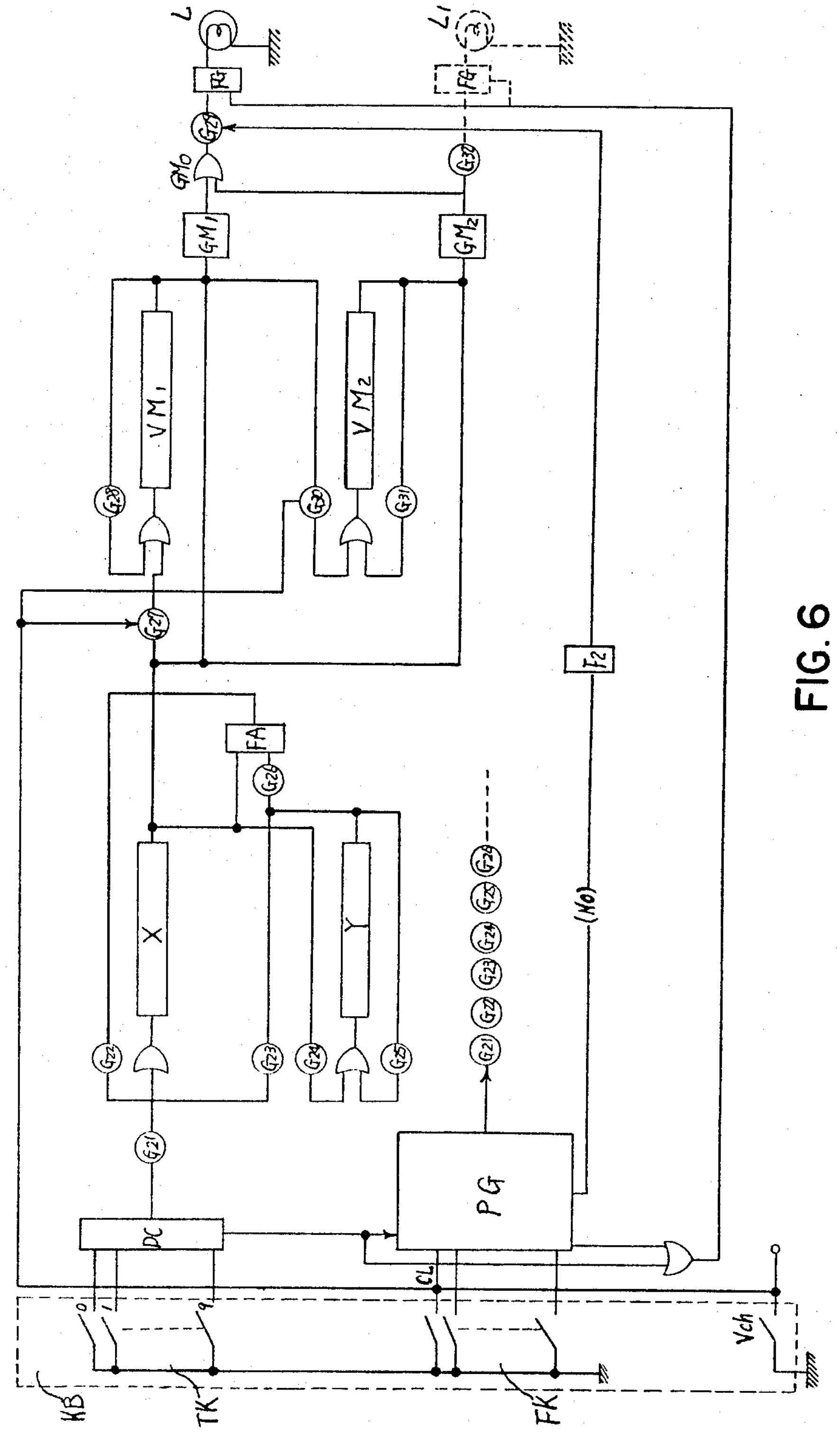
FIG. 6 is a schematic diagram showing a third embodiment of the verification systems.

In the embodiment shown in FIG. 6, electronic calculators are provided with two verify registers (or memories) VM1, VM2 and verify key Vch to obtain new function.

When the key V*ch* is depressed, the program memory PG is operative so that the contents of the register X are transferred to the first verify register VM1 through the gate G27 and the contents of the first verify register VM1 to the second verify register VM2 through the gate 30.

Assume that the arithmetic operations A⊠B⊟C, A1 ⊠B1⊟C1, A2⊠B2⊟C2, . . . are successively carried out as viewed from FIG. 7. After the end of the first operation A ⊠ B ⊟ C the verify key Vch is depressed to shift the calculator status to (e) state in FIG. 7. Further the calculator status is led to (i) state upon the second depression of the ⊟ key. In such arithmetic operation termination state (i) the contents of the register X and verify register VM 1 are compared with each other. At the same time the second verify register VM2 and the register X are compared as described later.

In the illustrated embodiment two coincidence gates GM1, GM2 are utilized to detect the coincidence between two verify register VM1, VM2 and an arithmetic register X and furthermore the lamp L is ON when the coincidence occurs. The coincidence outputs set the flip-flop FC1 through the gate G29. The set outputs from the flip-flop FC1 energizes the warning lamp L notifying the operator of the coincidence, which lamp L is de-energized by the resetting of the flip-flop FC1 in response to the key output.

The above coincidence detection operation is performed in response to one or more specified micro orders from the program memory PG which activates upon the set outputs from the flip-flop F2 being set by the detection of the transition state from the operation status $\overline{NO}$ to the non-operation status NO or the switchover to a certain address within the operation termination state.

When the flip-flop F2 is set and the program memory PG provides micro orders to open the gate G29, the contents C1 of the register X are compared with the contents of the first verify register VM1 in one coincidence circuit GM1 and at this time with the contents of the second verify register VM2 in another coincidence circuit GM2.

If the no-coincidence is seen in only one bit the lamp L is not energized. In this case the registor VM2 stores the results not associated with the performed arithmetic operation and thus the lamp L, of cource, is not energized. Before performing the third arithmetic operation the verify key Vch is depressed so that the previous arithmetic results C1, C are respectively transferred to the verify registers VM1, VM2. The lamp L is OFF.

The third arithmetic operation is also carried out in the same mode in response to the depression of the ⊟ key and its results C2 are stored in the register X. At this time the gate G29 is again opened to compare the previous results C1 with the new results C2. If C2=C1=C, the lamp L is ON notifying the operator that all the results are coincident. Conversely, if C2 = C1 ≠ C, the lamp L is not turned ON and thus the operator recognizes that both the results are not coincident.

Thereafter, the fourth calculation A3 ⊠ B3 ⊟ C3 is performed by repeating the same key operations and then the comparison is made between the results C3, C2 and C1. If C3 = C2 = C1, it is understood that all the results are correct. In such manner it becomes possible to confirm that the arithmetic results are correct by repeating the same operation three times.

Moreover, the outputs from the coincidence circuit GM2 can be separately displayed by providing the gate G22, flip-flop FC2 and lamp L1 shown by dotted lines.

We claim:

1. A key controlled electronic desk calculator, comprising:

manually operated keyboard means having digit keys and function keys with a preselected one of said function keys causing verification of computations;

a plurality of registers including a storage register and a verification register for retaining computed computations transferred thereto;

means connecting said storage register with said verification register for transferring computed computations from said storage register to said verification register;

a decoder connected with said digit keys and said storage register;

comparison means;

means connecting said storage register and said verification register with said comparison means;

program memory means connected with said comparison means and to said register to enable transfer of computed computations between said registers; and means connecting said function keys to said program memory means to control transfer of computed computations between said registers upon a first actuation of said one key and to cause verification between a second computation subsequently computed and stored in said first register with said first computation stored in said verification register upon a second actuation of said one key.

2. A key controlled electronic desk calculator in accordance with claim 1, said comparison means including a coincidence detection circuit means for providing a coincidence signal when the said first and second computations are coincident, an indication means, and means connecting said indication means to the output of said coincidence detection circuit, whereby a signal is produced by said indication means when said first and second computations are coincident.

3. A key controlled electronic desk calculator in accordance with claim 1, said comparison means including a no-coincidence detection circuit for providing a no-coincidence signal when the said first and second computations are different, an indication means, and means connecting said indication means to the output of said no-coincidence detection circuit, whereby a signal is produced by said indication means when said first and second computations are different.

* * * * *